United States Patent
Li

(10) Patent No.: US 7,202,918 B2
(45) Date of Patent: Apr. 10, 2007

(54) LCD PROJECTION SYSTEM AND ILLUMINATION DEVICE THEREOF

(75) Inventor: Kuo-Yuin Li, Tainan County (TW)

(73) Assignee: Himax Technologies, Inc., Tainan (TW)

( * ) Notice: Subject to any disclaimer, the term of this patent is extended or adjusted under 35 U.S.C. 154(b) by 0 days.

(21) Appl. No.: 10/636,023

(22) Filed: Aug. 7, 2003

(65) Prior Publication Data

US 2004/0075787 A1 Apr. 22, 2004

(30) Foreign Application Priority Data

Oct. 17, 2002 (TW) .............................. 91123930 A

(51) Int. Cl.
*G02F 1/1335* (2006.01)

(52) U.S. Cl. ................... 349/5; 349/9; 349/96; 349/98; 353/20; 353/98

(58) Field of Classification Search .................... 349/5, 349/96–98, 117–119, 9; 353/20, 98
See application file for complete search history.

(56) References Cited

U.S. PATENT DOCUMENTS

| | | | | |
|---|---|---|---|---|
| 5,042,921 A | * | 8/1991 | Sato et al. | ...................... 349/9 |
| 5,777,695 A | * | 7/1998 | Yamagishi | ................... 348/744 |
| 5,822,029 A | * | 10/1998 | Davis et al. | ................. 349/115 |
| 5,833,360 A | | 11/1998 | Knox et al. | |
| 6,081,378 A | | 6/2000 | Romano et al. | |
| 6,217,173 B1 | | 4/2001 | Huang et al. | |
| 6,634,755 B1 | * | 10/2003 | Okuyama et al. | .............. 353/31 |
| 2001/0021004 A1 | * | 9/2001 | Yano | ........................... 353/31 |
| 2001/0028412 A1 | * | 10/2001 | Ito | ................................. 349/5 |
| 2003/0007105 A1 | * | 1/2003 | Magarill et al. | ................ 349/5 |
| 2005/0073653 A1 | * | 4/2005 | Li | ............................... 353/20 |

* cited by examiner

*Primary Examiner*—David Nelms
*Assistant Examiner*—Thanh-Nhan Phan Nguyen
(74) *Attorney, Agent, or Firm*—Senniger Powers

(57) ABSTRACT

The present invention relates to an illumination device of an LCD projection system. The illumination device comprises a light source, a quarter-wave retardation and a wire grid polarizer. The light source is used for providing light. The quarter-wave retardation is disposed near the light source. The wire grid polarizer is disposed parallel to the quarter-wave retardation, and is associated with the quarter-wave retardation to polarize the light from the light source. P-polarized light can pass through the wire grid polarizer. S-polarized light cannot pass through the wire grid polarizer, and is reflected to the quarter-wave retardation to become circular polarized light. The circular polarized light is reflected by a parabolic surface of the light source and passes through the quarter-wave retardation again to convert into p-polarized light. The converted p-polarized light can pass through the wire grid polarizer. Therefore, the illumination device of the invention can provide high-efficiency polarized light. The illumination device can achieve high polarization conversion efficiency, and can be manufactured easily to reduce costs.

19 Claims, 7 Drawing Sheets

LCD PROJECTION SYSTEM AND ILLUMINATION DEVICE THEREOF

BACKGROUND OF THE INVENTION

1. Field of the Invention

The invention relates to an LCD projection system, and more particularly, to an LCD projection system and illumination device thereof.

2. Description of the Related Art

Referring to FIG. 1, a typical illumination device 10 of LCD projection system comprises a light source 11, a first lens array 12, a second lens array 13, a PS converter 14, a condenser 15 and a relay 16. The illumination device 10 is used for converting the light beams from the light source 11 into p-polarized light or s-polarized light (depending on the design of the LCD projection system.) The polarized light is desired by the optical system of the LCD projection system, since only polarized light can cause the modulation of the liquid crystal particles when they enter the liquid crystal panel, and then have the effect of message transportation through the liquid crystal panel. For the convenience of designation and description, the p-polarized light is illustrated throughout the specification. The light source 11 comprises a lamp 111 and a parabolic lampshade 112. The lamp 111 is disposed at the focus of the parabolic surface of the lampshade 112 for providing parallel light beams to the first lens array 12.

The first lens array 12 and second lens array 13 are used for concentrating the light beams to the PS converter 14. Referring to FIGS. 2 and 3a, the PS converter 14 comprises a polarizing beam splitter set that is composed of a plurality of polarizing beam splitters 141, a plurality of metal blocks 142 and a plurality of half-wave retardations 143. The metal blocks 142 are disposed on the illuminated surface of the polarizing beam splitter 141. Each of the half-wave retardations 143 has the corresponding shape with the metal block 142, as shown in FIG. 3a, and is disposed on the output surface of the polarizing beam splitter 141. The output surface is opposite to the illuminated surface. Each of the half-wave retardations 143 has a birefringence polymer film. When a light beam passes through the film, the phase difference of the light beam on the ordinary axis of the polymer film differs with that on the extraordinary axis in a half period.

The light beam concentrated by the first lens array 12 and second lens array 13 must be designed to pass the clearance between the metal blocks 142, so that the light beam can pass through the polarizing beam splitter 141 without being blocked by the metal block 142. The light beam that passes through the polarizing beam splitter 141 can be split into p-polarized light (light 171) and s-polarized light (light 172), wherein the p-polarized light exits directly and the s-polarized light passes through the half-wave retardation 143 after reflection. Because the included angle between the slow axis of the half-wave retardation and the s-polarized light is 45 degrees, the s-polarized light can be converted into p-polarized light. Therefore, all the light beams can be converted into p-polarized light by the PS converter 14.

Referring to FIG. 3b, when it is desirable to convert the light beams into s-polarized light, the disposition of the half-wave retardation 243 must be different that of the half-wave retardation 143 in FIG. 3a. The light beam that passes through the polarizing beam splitter 241 can be split into p-polarized light (light 271) and s-polarized light (light 272), wherein the s-polarized light exits directly after reflection and the p-polarized light passes through the half-wave retardation 243 so that the p-polarized light can be converted into s-polarized light. Therefore, all of the light beams can be converted into s-polarized light by the PS converter 24.

However, since the metal blocks 142 block the light beams from passing through the polarizing beam splitter 141, the brightness efficiency is degraded. Further, the first lens array 12 and second lens array 13 must be designed to let the concentrated light beam pass the clearance between the metal blocks 142, so that the light beam can pass through the polarizing beam splitter 141. Therefore, the first lens array 12, second lens array 13 and PS converter 14 must be aligned and fit to each other, which will increase the difficulty of overall production and the cost, and reduce light efficiency.

Additionally, the polarization conversion efficiency (PCE) obtained by the typical illumination device 10 is usually 130 to 140%, hardly reaching the ideal value (160%), which is not good enough.

Consequently, there is a need for a novel and improved illumination device to solve above-mentioned problem.

SUMMARY OF THE INVENTION

The primary objective of this invention is to provide an illumination device, comprising: a light source, a quarter-wave retardation, and a wire grid polarizer. The light source is used for providing light beams. The quarter-wave retardation is disposed near the light source. The wire grid polarizer is parallel to the quarter-wave retardation, and is associated with the quarter-wave retardation to polarize the light beams from the light source. In the present invention, the light that can pass through the wire grid polarizer is p-polarized light, whereas the s-polarized light that cannot pass through the wire grid polarizer reflects and passes through the quarter-wave retardation to become circular polarized light, which is then reflected by the parabolic lampshade of the light source, then passes through the quarter-wave retardation again. The circular polarized light becomes p-polarized light, and can pass through the wire grid polarizer. Therefore, the illumination device of the present invention can provide p-polarized light.

The wire grid polarizer of the present invention is a reflection type that can reflect the non p-polarized light back to the parabolic lampshade, which is not like the typical absorption type polarizers that absorbs the non p-polarized light. Therefore, the wire grid polarizer in the present invention can endure higher temperatures than typical absorption type polarizers.

Furthermore, the non p-polarized light can be recycled and converted into the p-polarized light due to the arrangement of the quarter-wave retardation and wire grid polarizer according to the present invention, the illumination device according to the present invention has an excellent polarization conversion efficiency. Additionally, the illumination device according to the present invention does not have the problem of concentration between the lens array and PS converter of typical illumination device, which reduces the difficulty of production of the illumination device according to the present invention and lowers the cost.

Another objective of this invention is to provide an LCD projection system that comprises an illumination device and an imaging apparatus. The illumination device is equivalent to that described above, and is used for providing polarized light. The imaging apparatus is for receiving the p-polarized light from the illumination device, and utilizes liquid crystal panels to produce and project images.

The structures and characteristics of this invention can be realized by referring to the appended drawings and explanations of the preferred embodiments.

The following Examples are given for the purpose of illustration only and are not intended to limit the scope of this invention.

DETAILED DESCRIPTION OF THE INVENTION

Figure 4A:
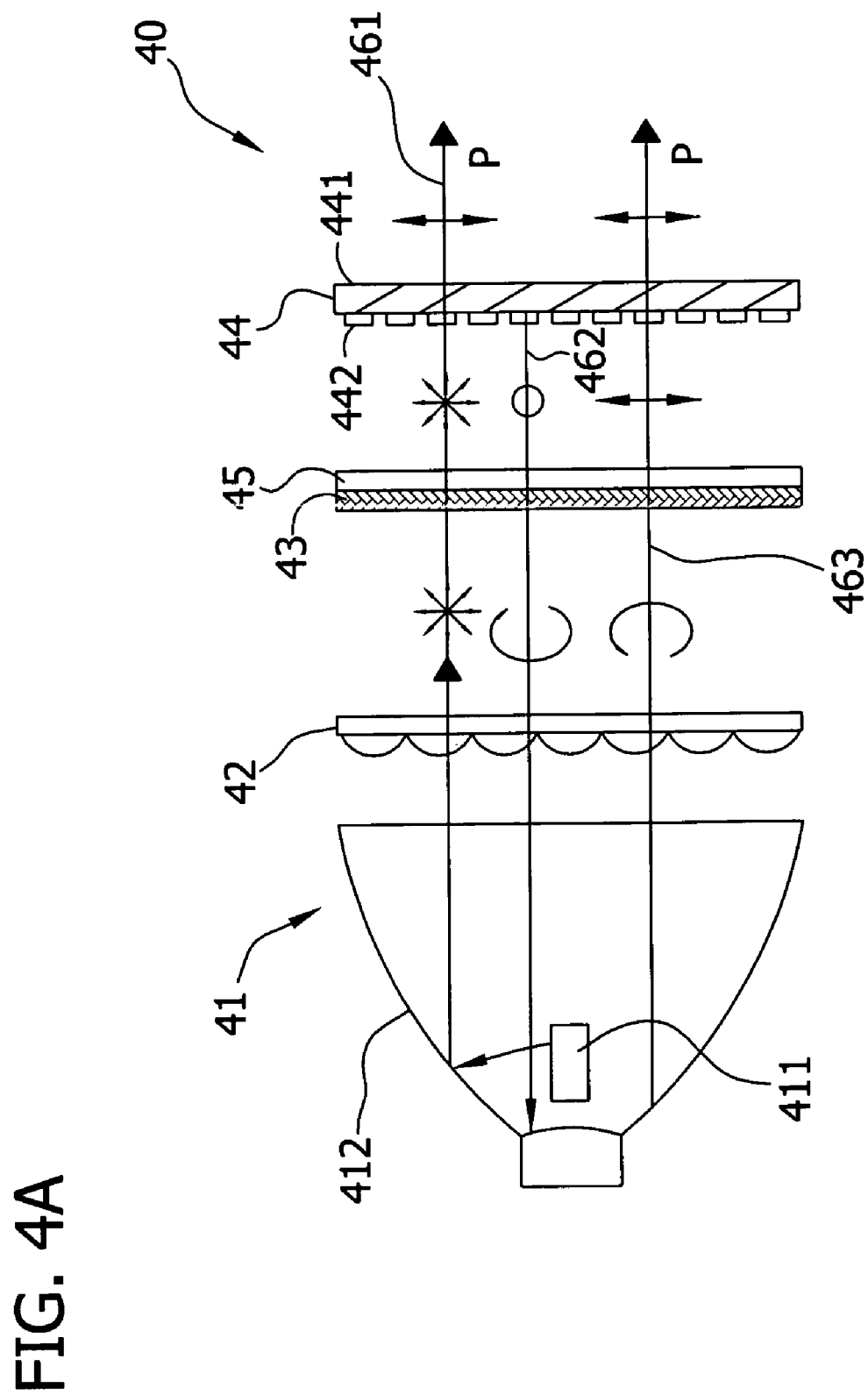
FIG. 4a is a schematic representation of an illumination device according to the first embodiment of the present invention.

Referring to FIG. 4a, an illumination device 40 according to the first embodiment of the present invention comprises: a light source 41, a lens array 42, a quarter-wave retardation 43 and a wire grid polarizer 44. The light source 41, the lens array 42, the quarter-wave retardation 43 and the wire grid polarizer 44 are arranged in a straight line. The illumination device 40 is used for converting the light beam from the light source into the p-polarized light. The light source 41 comprises a lamp 411 and a parabolic lampshade 412. The parabolic lampshade 412 has a reflecting surface for reflecting light beams. The lamp 411 is disposed at the focus of the parabolic surface of the lampshade 412 so that the light beams that reflect off the parabolic lampshade 412 become parallel light beams that are provided to the lens array 42 along a light axis (not show in the figure.)

The lens array 42 is substantially perpendicular to the light axis for preliminary unifying the parallel light beams from said light source 41. The quarter-wave retardation 43 is substantially perpendicular to the light axis, preferably adhered to a transparent glass plate 45. The quarter-wave retardation 43 is parallel to the lens array 42, and they have an appropriate interval. The wire grid polarizer 44 is parallel to the quarter-wave retardation 43, and they have an appropriate interval. Those skilled in the art will appreciate that the wire grid polarizer 44 has multiple parallel strips 442 supported by a substrate 441. The included angle between the slow axis of the quarter-wave retardation 43 and the absorptive axis of the wire grid polarizer 44 is designed to be 45 degrees. The absorptive axis of the wire grid polarizer 44 is perpendicular to the surface of the paper so as to produce the p-polarized light. The quarter-wave retardation 43 has a birefringence polymer film. When a light beam passes through the film, the phase difference of the light beam on the ordinary axis of the polymer film differs with that on the extraordinary axis in a quarter period. Therefore, the Quarter-wave retardation 43 can generate a phase difference of a quarter period between light before and after passing through the retardation.

The preliminarily unified parallel light beams pass through the quarter-wave retardation 43 and wire grid polarizer 44, wherein the design of the absorptive axis of the wire grid polarizer 44 can let the p-polarized light pass. The non p-polarized light, the s-polarized light, cannot pass and will be reflected back. Therefore, the light that passes through the wire grid polarizer 44 is the desired p-polarized light (light 461.)

The s-polarized light that cannot pass through the wire grid polarizer 44 reflects and passes through the quarter-wave retardation 43 again to become right-handed or left-handed circular polarized light (the left-handed circular polarized light is shown in the figure), then reflects to the parabolic lampshade 412 of the light source 41, and the left-handed circular polarized light becomes right-handed circular polarized light by the reflection of the parabolic lampshade 412 of the light source 41, as shown by light 463. When it passes through the quarter-wave retardation 43 again, the circular polarized light becomes p-polarized light, and can pass through the wire grid polarizer 44. Therefore, the light beams can be polarized due to the arrangement of the quarter-wave retardation 43 and wire grid polarizer 44 according to the illumination device 4 of the present invention.

Figure 4C:
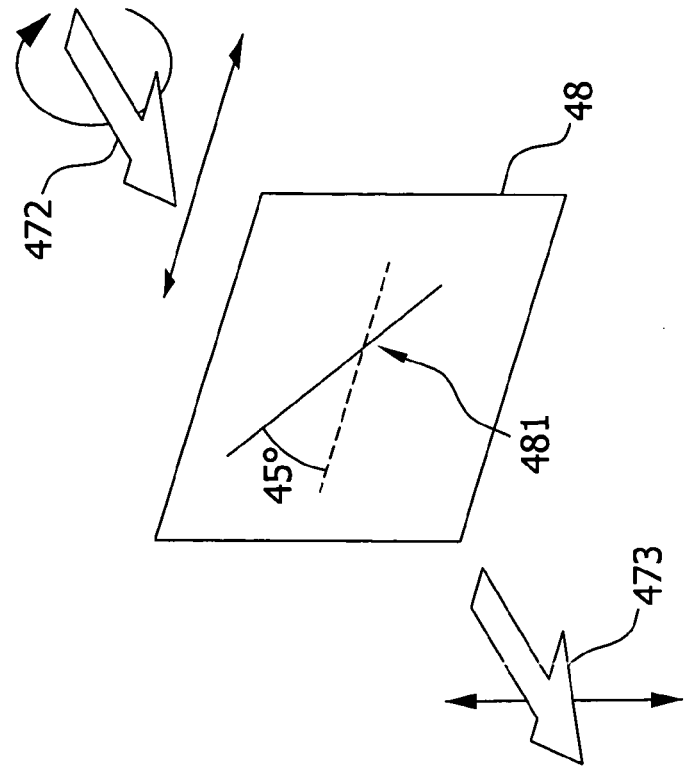
FIG. 4c is a schematic representation of the circular polarized light converted into p-polarized light by passing a quarter-wave retardation.
Figure 4B:
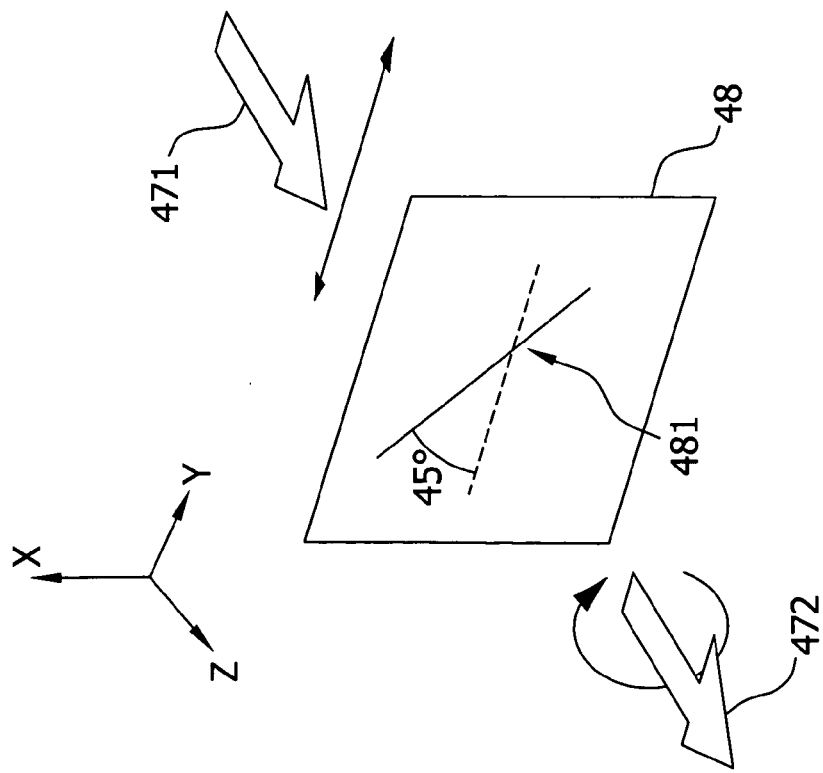
FIG. 4b is a schematic representation of the light beam converted into circular polarized light by passing a quarter-wave retardation.

The theory is shown in FIGS. 4b and 4c. Referring to FIG. 4b, when a linear polarized light 471 with a transmitting direction along the z-axis and a polarization direction of zero degrees passes through a quarter-wave retardation 48 that has a 45 degree included angle between its slow axis 481 and the y-axis is converted into a circular polarized light 472. Referring to FIG. 4c, when the circular polarized light 472 passes through the quarter-wave retardation 48 again, it will be converted into linear polarized light 473 with a polarization direction of 90 degrees. Therefore, if linear polarized light with a polarization direction of zero degrees passes through a quarter-wave retardation twice, it will be converted into linear polarized light with a polarization direction of 90 degrees.

Figure 5:
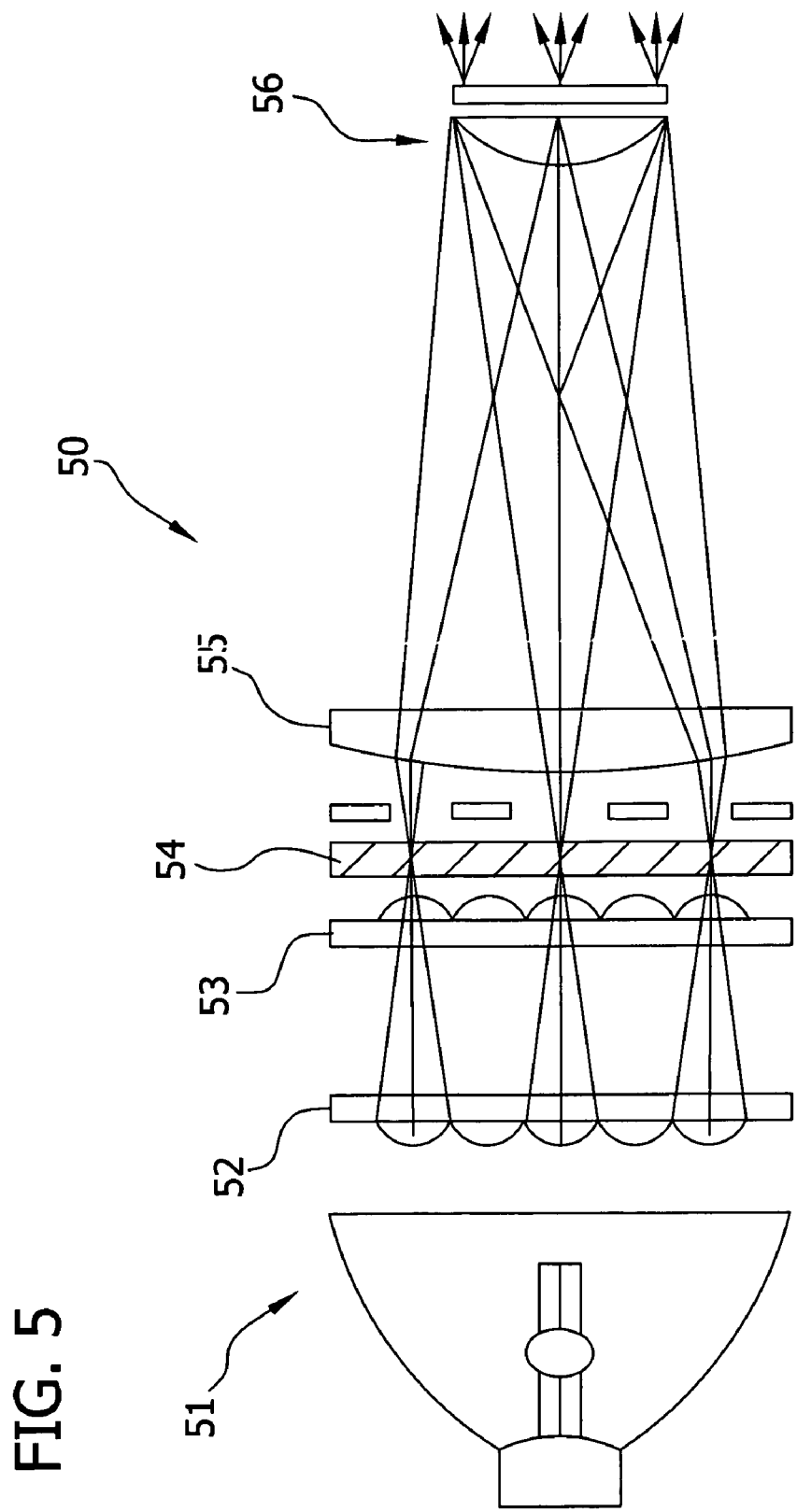
FIG. 5 is a schematic representation of an illumination device according to the second embodiment of the present invention.

Referring to FIG. 5, an illumination device 50 according to the second embodiment of the present invention comprises: a light source 51, a lens array 52, a quarter-wave retardation 53, a wire grid polarizer 54, a condenser 55 and a relay 56. The difference between the first embodiment and the second embodiment is the quarter-wave retardation 53 of the second embodiment is adhered to the illuminated surface of the wire grid polarizer 54. Therefore, the illumination device 50 can polarize the light beams providing the p-polarized light due to the arrangement of the quarter-wave retardation 53 and wire grid polarizer 54. The condenser 55 is used for unifying the shape of the light beams, and the relay 56 is used for concentrating and collimating the light beams. The illumination device 50 can unify the shape of the light beams completely due to the arrangement of the condenser 55 and the relay 56.

Because the wire grid polarizers 44 and 54 are reflection type for reflecting the non p-polarized light, the s-polarized light, back to the parabolic lampshade, the wire grid polarizers in the present invention can endure higher temperatures than typical absorption type polarizers.

Furthermore, the non p-polarized light, the s-polarized light, can be recycled and converted into p-polarized light due to the arrangement of the quarter-wave retardation and the wire grid polarizer according to the present invention, the illumination device according to the present invention has an excellent polarization conversion efficiency. The results of experiments show that the polarization conversion efficiency of the illumination device according to the present invention is about 120% of that of a typical illumination device. The results of experiments show that the polarization conversion efficiency of typical illumination device is 144%, therefore, the polarization conversion efficiency of the illumination device according to the present invention is about 173% (144%*120%).

Figure 1:
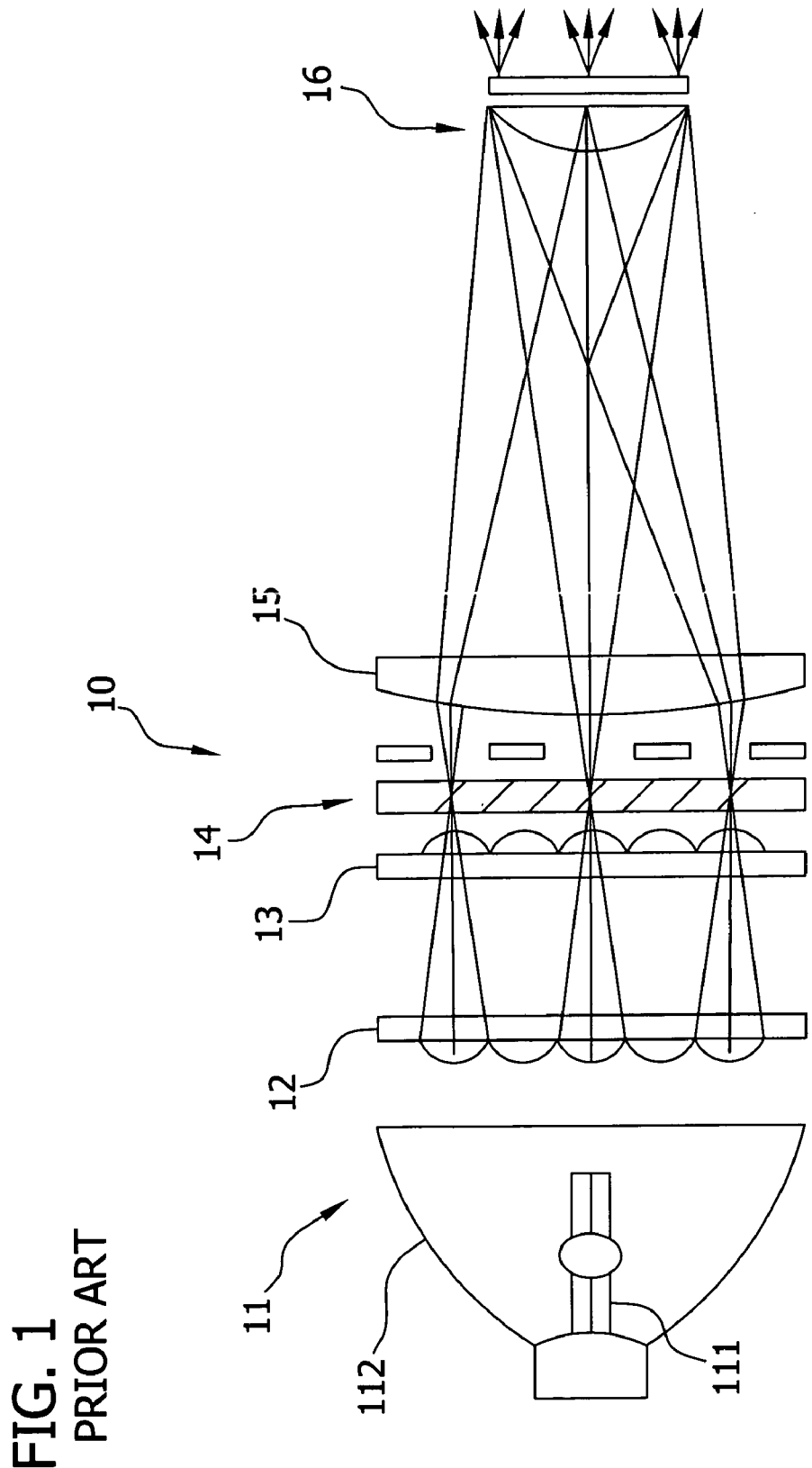
FIG. 1 is a schematic representation of a typical illumination device of the prior art.
Figure 2:
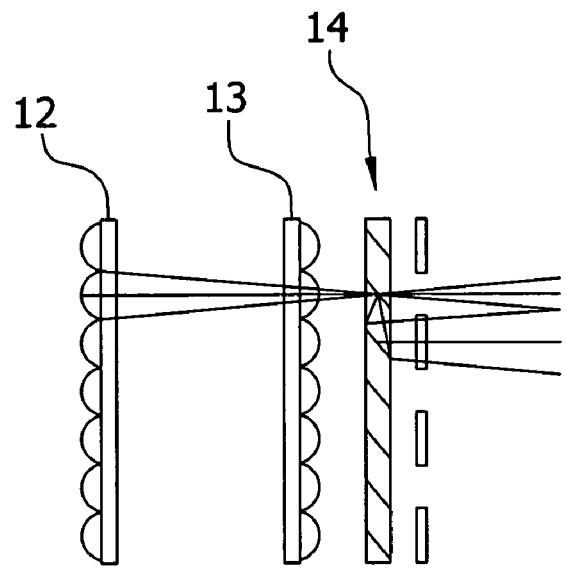
FIG. 2 is a schematic representation of the concentration of the light beams in the typical illumination device of the prior art.
Figure 3A:
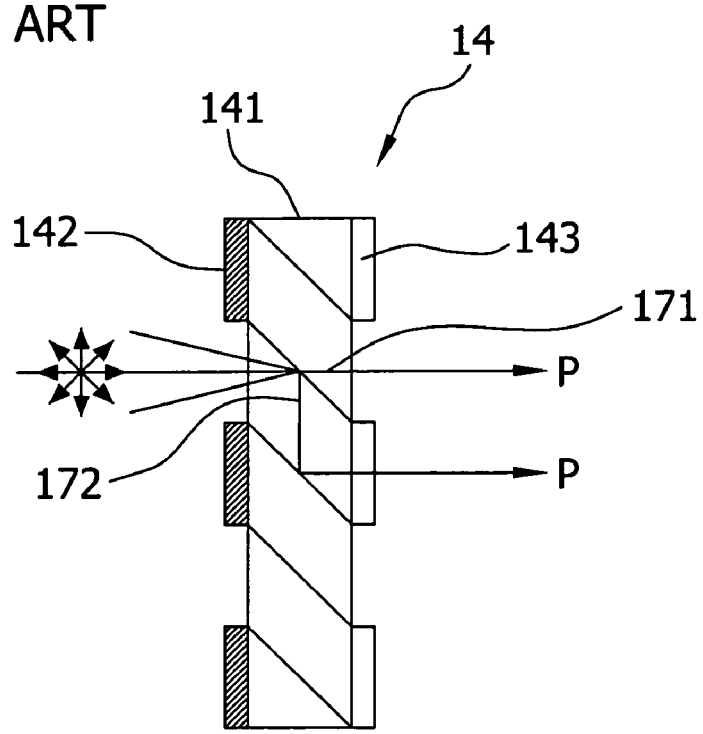
FIG. 3a is a schematic representation of a PS converter that produces the p-polarized light in the typical illumination device of the prior art.
Figure 3B:
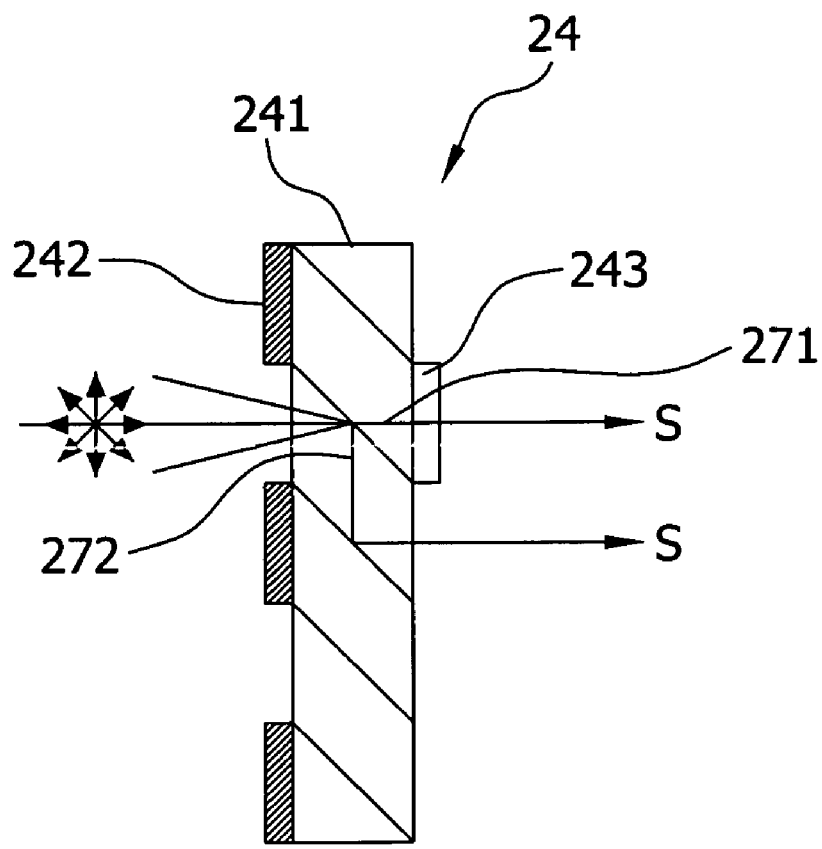
FIG. 3b is a schematic representation of a PS converter that produces the s-polarized light in the typical illumination device of the prior art.

Additionally, since the illumination device according to the present invention does not utilize the lens array and PS converter of typical illumination devices to convert the light beams, there are no complicated problems of alignment and concentration between the lens array and PS converter of typical illumination devices. Therefore, at least one lens array (e.g., the second lens array 13 in FIG. 1) can be omitted, which reduces the difficulty of production of the illumination device according to the present invention and lowers the cost.

Figure 6:
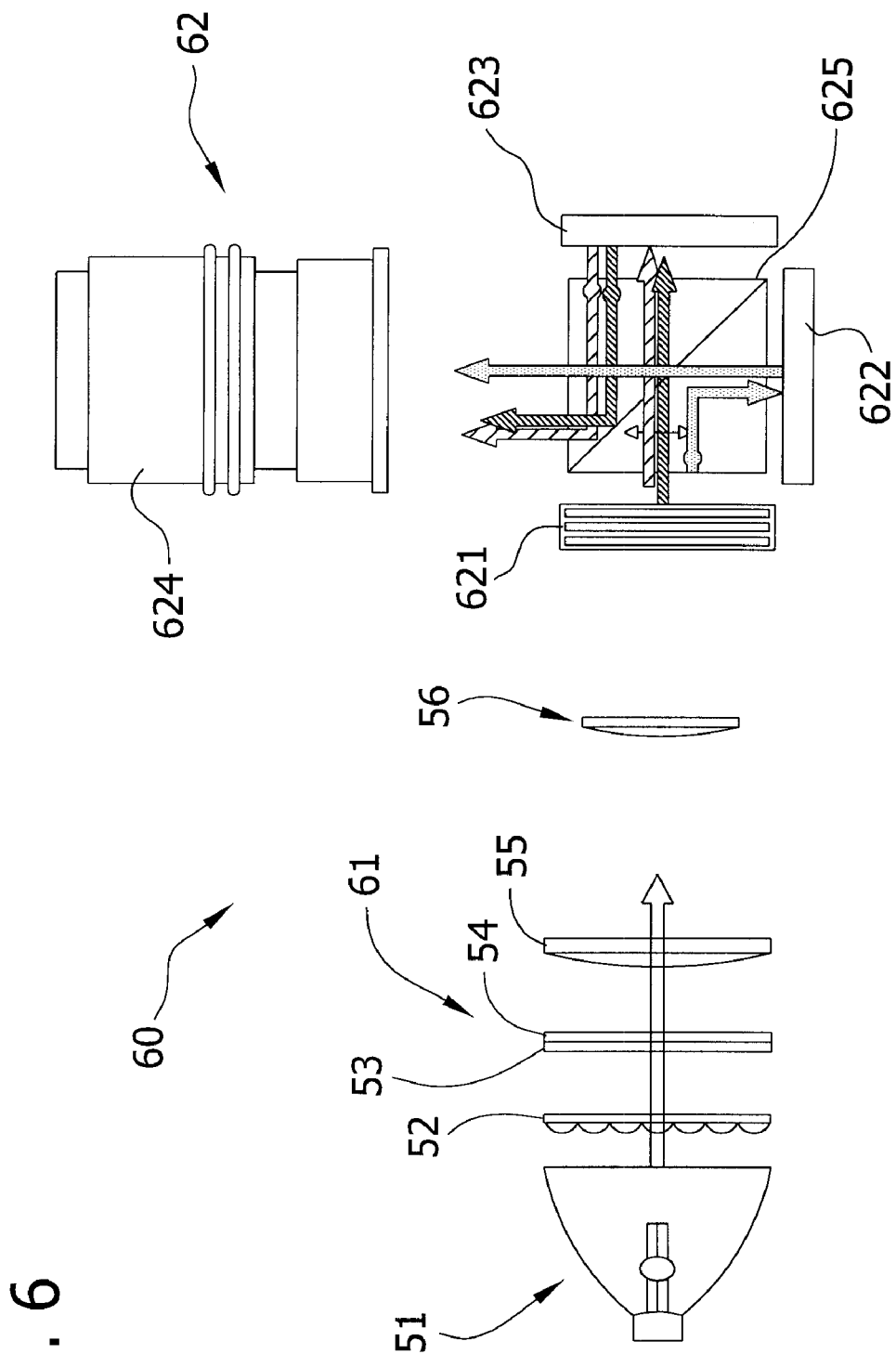
FIG. 6 is a schematic representation of an LCD projection system according to the present invention.

Referring to FIG. 6, the LCD projection system 60 according to the present invention comprises an illumination device 61 and an imaging apparatus 62. The illumination device 61 is the illumination device 50 in the second embodiment, and is used for providing p-polarized light. The imaging apparatus 62 is for receiving the p-polarized light from said illumination device 61 and projecting image.

The imaging apparatus 62 comprises a color selector 621, a polarizing beam splitter (PBS) 625, two liquid crystal panels 622,623 and a lens 624. The color selector 621 is adapted for selecting the desired color and its complementary color. The PBS 625 is used for receiving the p-polarized light from the polarizer 54 of the illumination device 61. The two liquid crystal panels 622,623 are reflective liquid crystal on silicon (LCoS) panels 622,623 and comprise a plurality of pixels respectively for producing the desired image and projecting the image through the lens 624. That is, the PBS 625 directs light from the polarizer 54 toward a panel 622 or 623 producing an image to be projected.

Theoretically, if the p-polarized light from the illumination device 61 is pure p-polarized light, the color selector 621 and the liquid crystal panel 622 can be omitted. However, in actual condition, the p-polarized light from the illumination device 61 is not pure p-polarized light and may have less s-polarized light; therefore, the color selector 621 and the liquid crystal panel 622 cannot be omitted. The p-polarized light passes through the PBS 625 directly and then is reflected by the liquid crystal panel 623. The s-polarized light is reflected by the PBS 625, then reflected by the liquid crystal panel 623, and then passes through the PBS 625 directly.

While several embodiments of this invention have been illustrated and described, various modifications and improvements can be made by those skilled in the art. The embodiments of this invention are therefore described in an illustrative but not restrictive sense. It is intended that this invention may not be limited to the particular forms as illustrated, and that all modifications which maintain the spirit and scope of this invention are within the scope as defined in the appended claims.

What is claimed is:

1. A projection system, comprising:
   a light source having a reflecting surface;
   a retardation generating a phase difference of a quarter period between light before and after passing through the retardation;
   a polarizer allowing light of a first polarity to pass through while reflecting light of a second polarity;
   a polarizing beam splitter directing light from the polarizer toward a panel producing an image to be projected;
   wherein the light source emits a light beam passing through the retardation to the polarizer so that light of the first polarity in the light beam passes through the polarizer to the polarizing beam splitter while that of the second polarity is reflected by the polarizer through the retardation to the reflecting surface and further reflected by the reflecting surface through the retardation to the polarizer.

2. The projection system as claimed in claim 1, wherein the polarizer has an illuminated surface in front of the light source, and the retardation adheres to the illuminated surface.

3. The projection system as claimed in claim 1, further comprising a transparent glass plate that adheres to the retardation.

4. The projection system as claimed in claim 1, further comprising a lens array disposed between the light source and the retardation and being substantially perpendicular to the light axis, thereby preliminarily unifying the light beams from the light source.

5. The projection system as claimed in claim 1, wherein the retardation has a slow axis, the polarizer has an absorptive axis, of which the slow axis and the absorptive axis define an included angle of substantially 45 degrees.

6. The projection system as claimed in claim 1, wherein the light source further comprises a lamp and a parabolic lampshade, and the parabolic lampshade has the reflecting surface, of which the lamp is disposed at the focus of the parabolic surface of the lampshade for providing a plurality of parallel light beams.

7. The projection system as claimed in claim 1, further comprising a condenser and a relay, the condenser being used for unifying a shape of the light beam, and the relay being used for concentrating and collimating the light beam.

8. The projection system as claimed in claim 1, further comprising at least one liquid crystal panel and a lens, wherein the polarizing beam splitter receives the light of a first polarity from the polarizer and the liquid crystal panel is adapted for producing the image and projecting the image through the lens.

9. The projection system as claimed in claim 8, further comprising a color selector, and the amount of the liquid crystal panels is two, of which the color selector is adapted for selecting the desired color and its complementary color, and the two liquid crystal panels are adapted for producing the image and projecting the image through the lens.

10. The projection system as claims in claimed 1, wherein the polarizer has multiple parallel strips supported by a substrate.

11. A projection system, comprising:
    a light source having a reflecting surface;
    a retardation generating a phase difference of a quarter period between light before and after passing through the retardation;

a wire grid polarizer allowing light of a first polarity to pass through while reflecting light of a second polarity, the polarizer having multiple parallel strips supported by a substrate; and a polarizing beam splitter directing light from the polarizer toward a panel producing an image to be projected, wherein the light source emits a light beam passing through the retardation to the wire grid polarizer so that light of the first polarity in the light beam passes through the wire grid polarizer to the polarizing beam splitter while that of the second polarity is reflected by the wire grid polarizer through the retardation to the reflecting surface and further reflected by the reflecting surface through the retardation to the wire grid polarizer.

12. The projection system as claimed in claim 11, wherein the polarizer has an illuminated surface in front of the light source, and the retardation adheres to the illuminated surface.

13. The projection system as claimed in claim 11, further comprising a transparent glass plate that adheres to the retardation.

14. The projection system as claimed in claim 11, further comprising a lens array disposed between the light source and the retardation and being substantially perpendicular to the light axis, thereby preliminarily unifying the light beams from the light source.

15. The projection system as claimed in claim 11, wherein the retardation has a slow axis, the polarizer has an absorptive axis, of which the slow axis and the absorptive axis define an included angle of substantially 45 degrees.

16. The projection system as claimed in claim 11, wherein the light source further comprises a lamp and a parabolic lampshade, and the parabolic lampshade has the reflecting surface, of which the lamp is disposed at the focus of the parabolic surface of the lampshade for providing a plurality of parallel light beams.

17. The projection system as claimed in claim 11, further comprising a condenser and a relay, the condenser is used for unifying a shape of the light beam, and the relay is used for concentrating and collimating the light beam.

18. The projection system as claimed in claim 11, further comprising at least one liquid crystal panel and a lens, wherein the polarizing beam splitter receives the light of a first polarity from the polarizer and the liquid crystal panel is adapted for producing the image and projecting the image through the lens.

19. The projection system as claimed in claim 18, further comprising a color selector, and the amount of the liquid crystal panels is two, of which the color selector is adapted for selecting the desired color and its complementary color, and the two liquid crystal panels are adapted for producing the image and projecting the image through the lens.

* * * * *